United States Patent [19] [11] 4,085,563
Egee et al. [45] Apr. 25, 1978

[54] COOKIE DISPENSING APPARATUS

[75] Inventors: Walter W. Egee, Wallingford, Pa.; Clarence W. Cramer, Burlington, N.J.

[73] Assignee: Campbell Soup Company, Camden, N.J.

[21] Appl. No.: 764,190

[22] Filed: Jan. 31, 1977

[51] Int. Cl.² .......................... B65B 57/10; B65B 35/44
[52] U.S. Cl. ..................................... 53/59 R; 53/164; 53/240; 53/250; 198/415; 198/461
[58] Field of Search ............... 53/59 R, 159, 164, 237, 53/240, 250; 198/415, 461; 271/34, 150, 151

[56] References Cited

U.S. PATENT DOCUMENTS 2,764,274 9/1956 Griswold et al. ................. 198/415 X
3,927,508 12/1975 Campbell ........................... 53/159 X Primary Examiner—Travis S. McGehee
Attorney, Agent, or Firm—Howson and Howson

[57] ABSTRACT

Apparatus for automatically dispensing stacks of cookies into the pockets of cookie packaging trays. A succession of multi-pocket cookie trays are intermittently advanced along a horizontal tray conveyor. Cookie delivery assemblies located in spaced relation along said tray conveyor each include a cookie delivery line and a cookie dispenser assembly which deposits stacks of cookies in the tray pockets during the dwell phase of the intermittent tray conveyor.

Each said cookie delivery line includes a shingler assembly and a separator assembly. The shingler assembly comprises a pair of spaced parallel horizontal feed belts onto which the cookies are manually loaded in edge-supported face-abutting relation and an underlying shingling belt traveling at a faster speed than said feed belts. The feed belts serve to advance the array of cookies toward the separator assembly while the shingling belt engages the lower edges of the cookies and tilts the cookies into an inclined attitude.

The separator assembly comprises a pair of spaced separating wheels which grip the lower side edges of each inclined cookie to separate the cookie from the array and transfer it into a horizontal disposition on a separating conveyor. The separator assembly further includes an accelerating conveyor onto which the cookies drop from the separating conveyor and which produces a substantial spacing between the conveyed cookies.

The dispenser assembly includes a stacking chamber into which the cookies are fed by the accelerating conveyor. The bottom of the stacking chamber is normally closed by a rotatable gate controlled by a gate actuating means which on receipt of an appropriate signal rotates the gate to drop the accumulated stack of cookies in the stacking chamber into the cookie tray pocket located therebelow. Cookie detector and counter means prevent actuation of the dispenser gate until a predetermined number of cookies have been deposited in the stacking chamber and then only when the tray conveyor has stopped to locate a tray pocket therebeneath. Control means are provided to stop the operation of the shingler and separator assemblies momentarily whenever the stacking chamber contains the predetermined number of cookies and an additional excess cookie is about to be added to the chamber.

23 Claims, 24 Drawing Figures

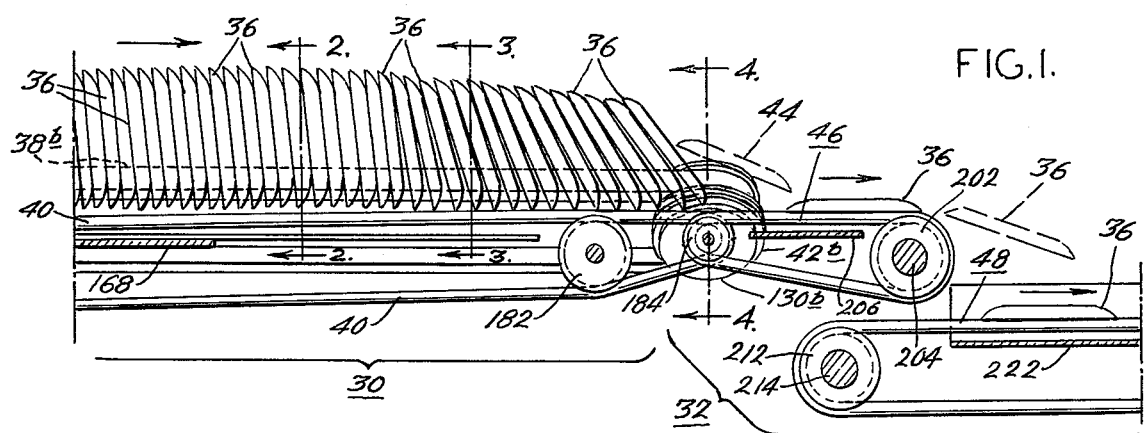
FIG.1.
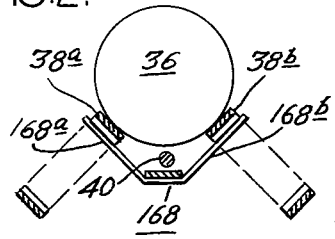
FIG.2.
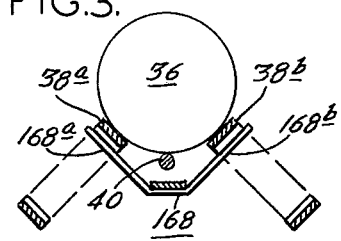
FIG.3.
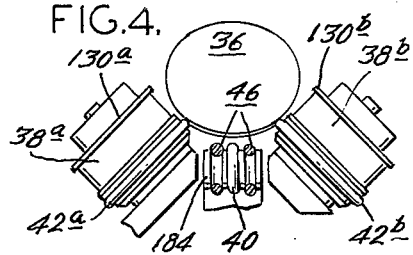
FIG.4.
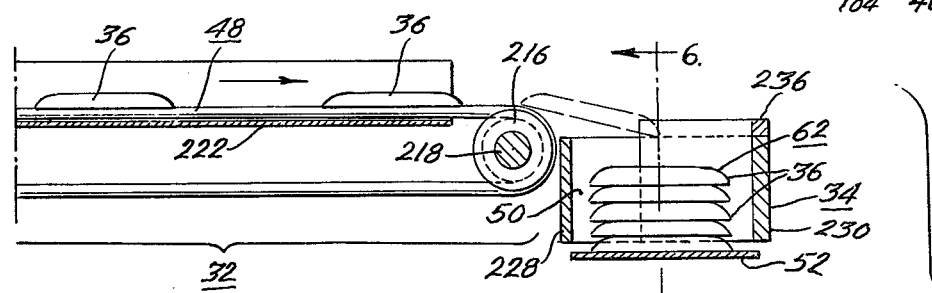
FIG.5.
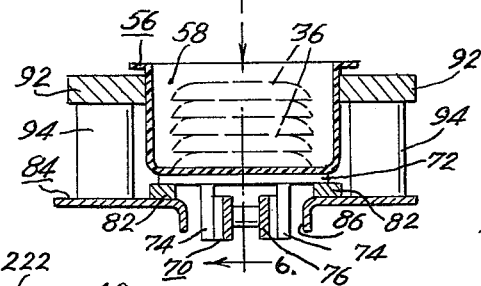
FIG.6.
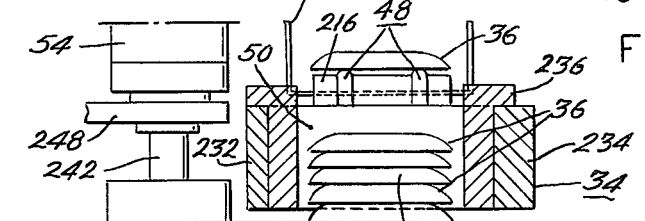
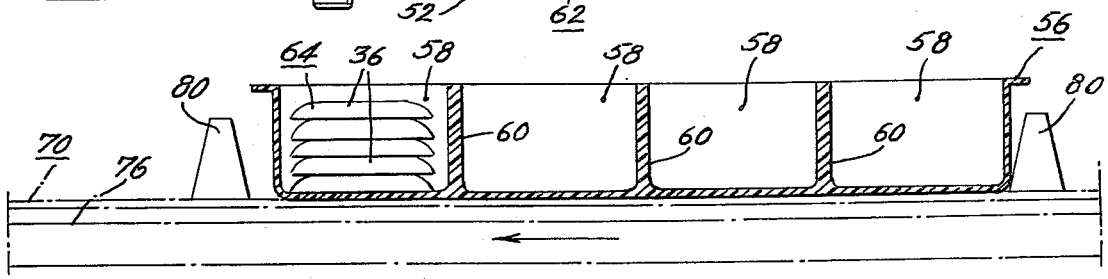

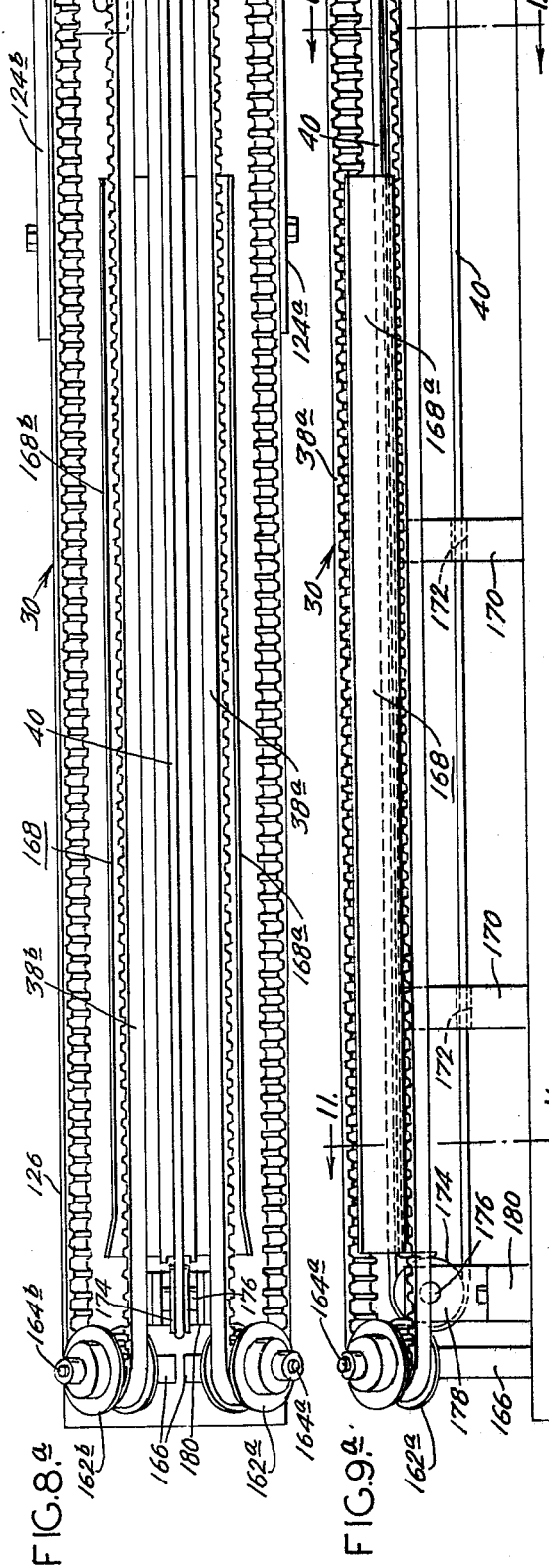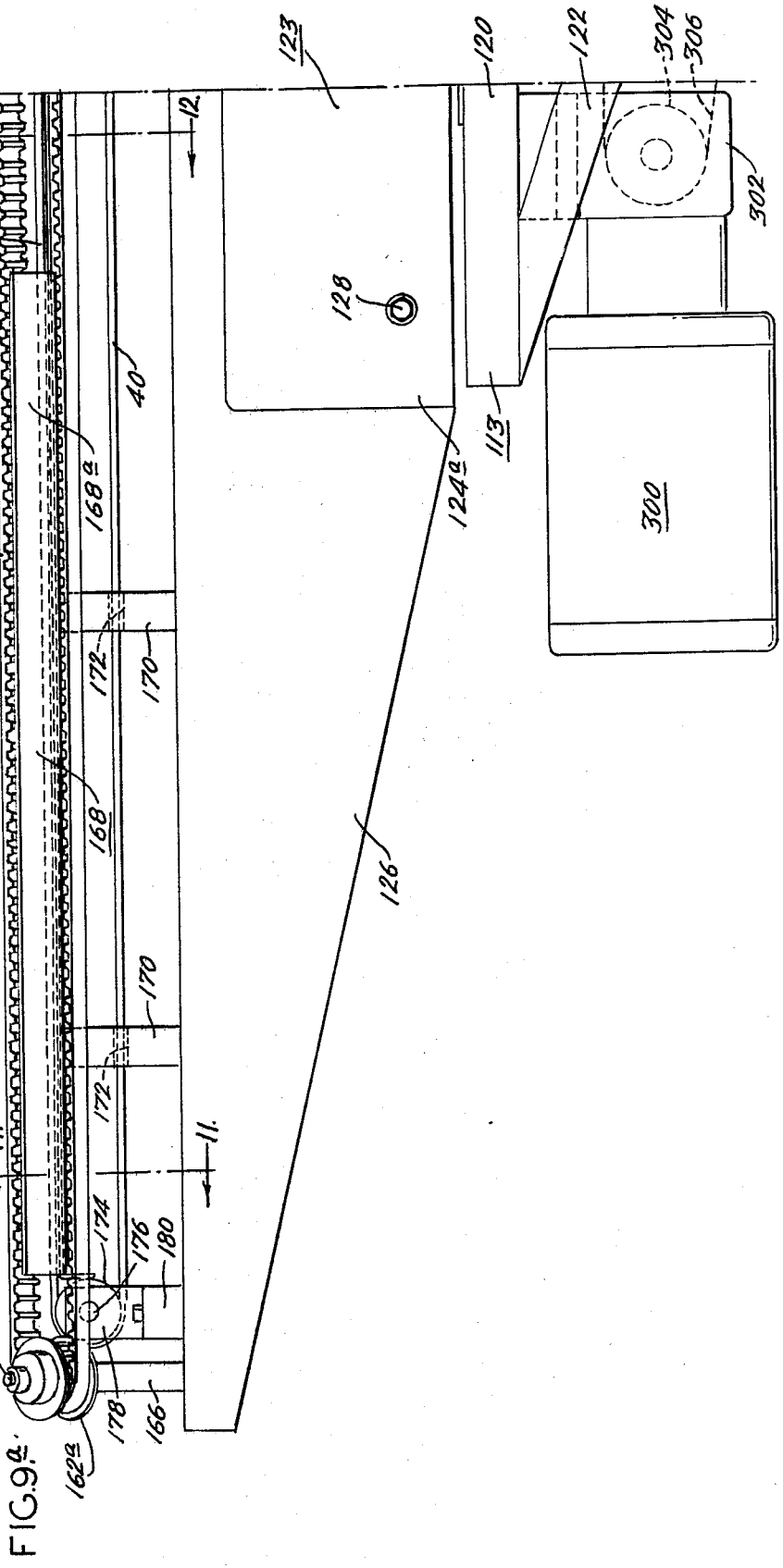

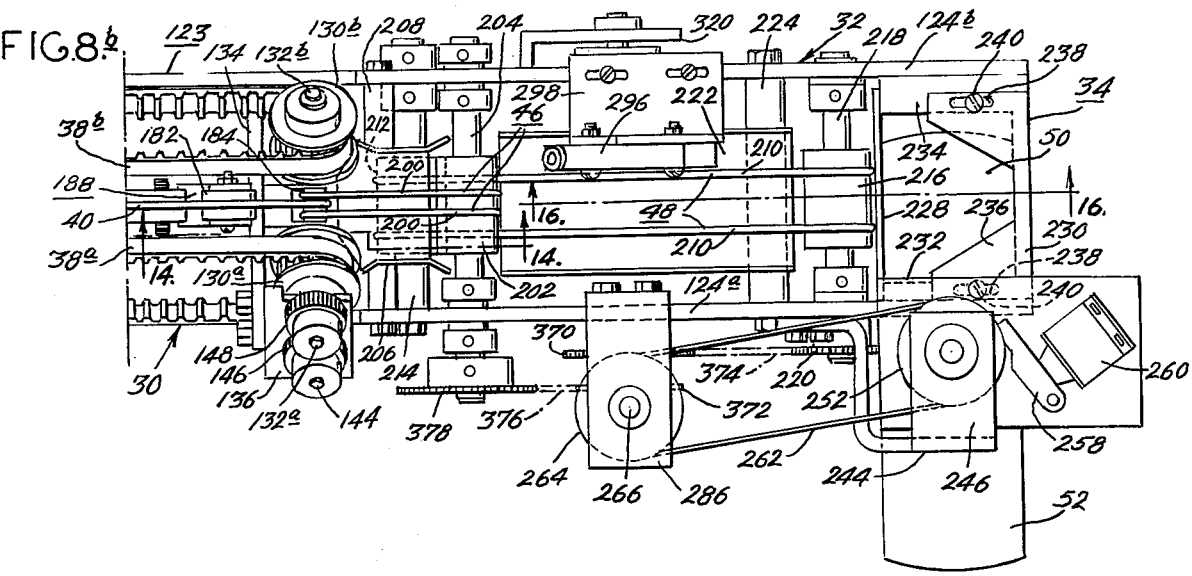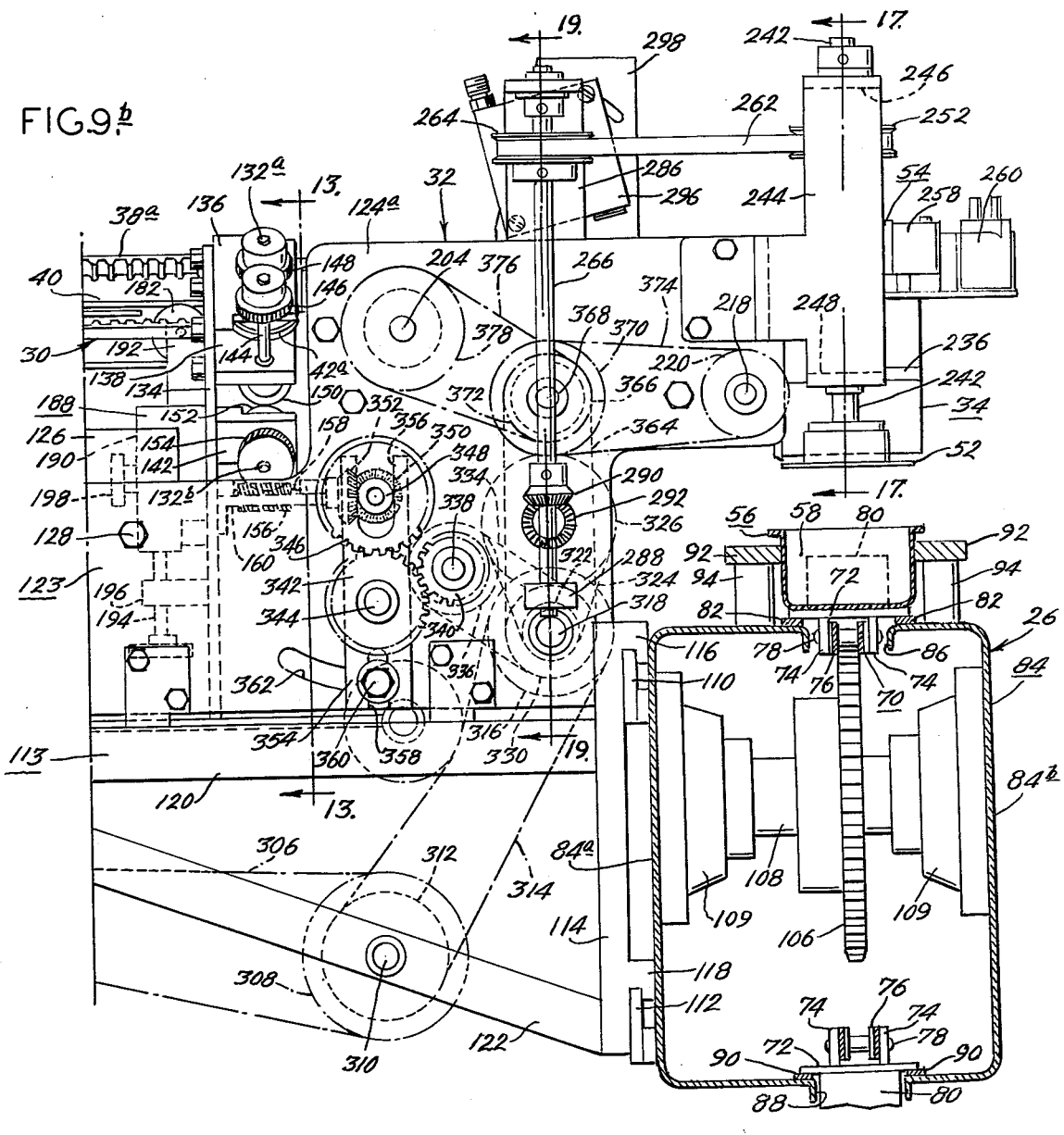

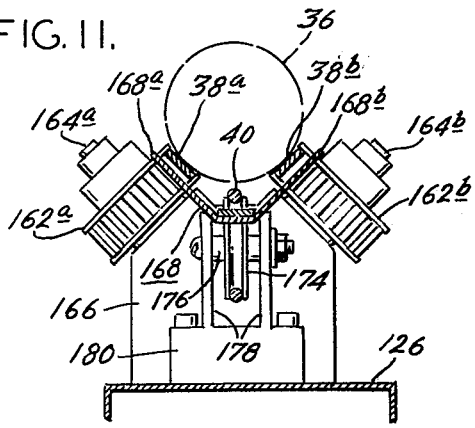
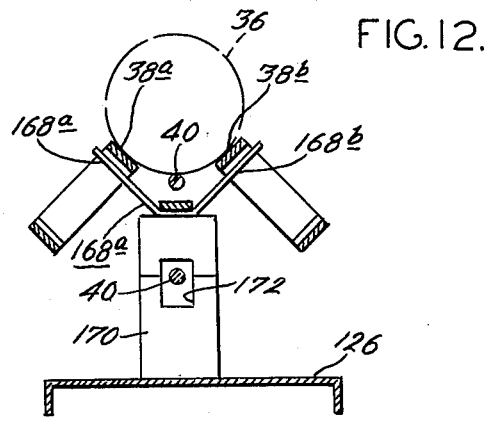
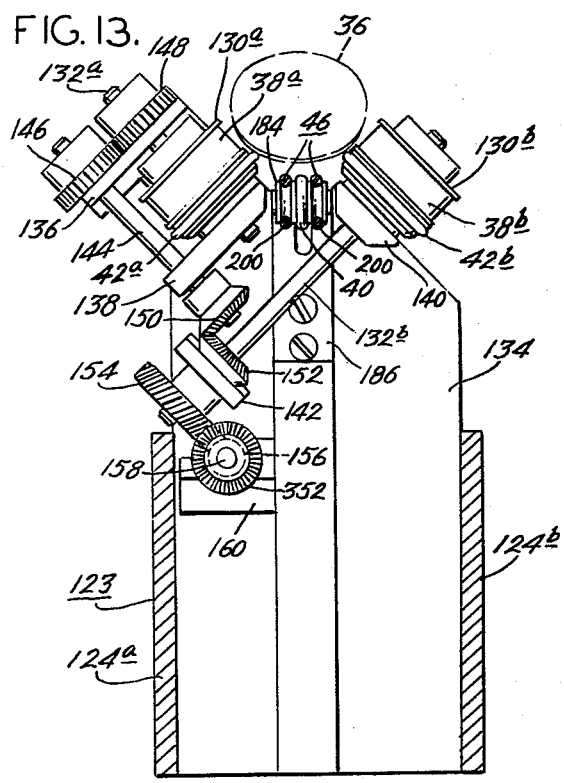
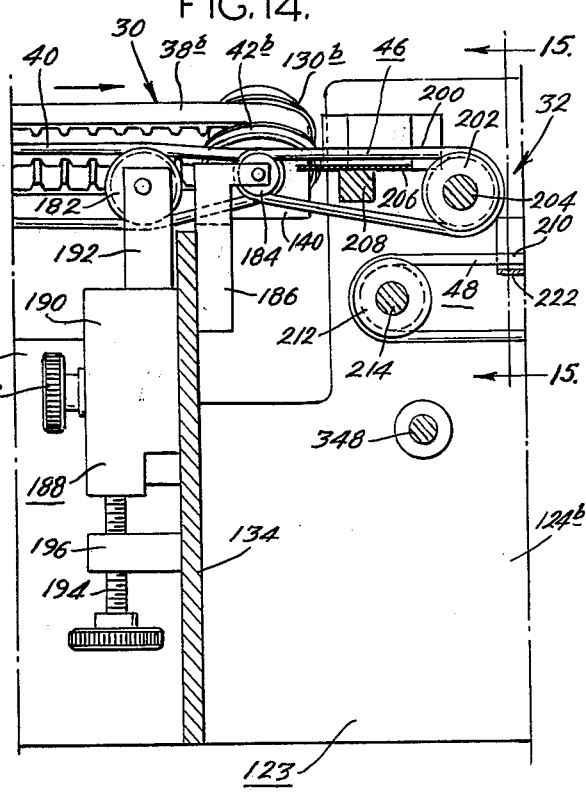
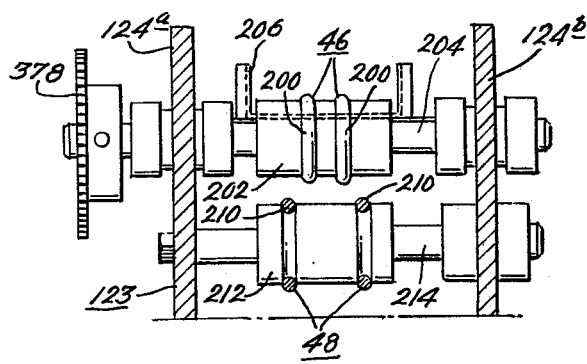

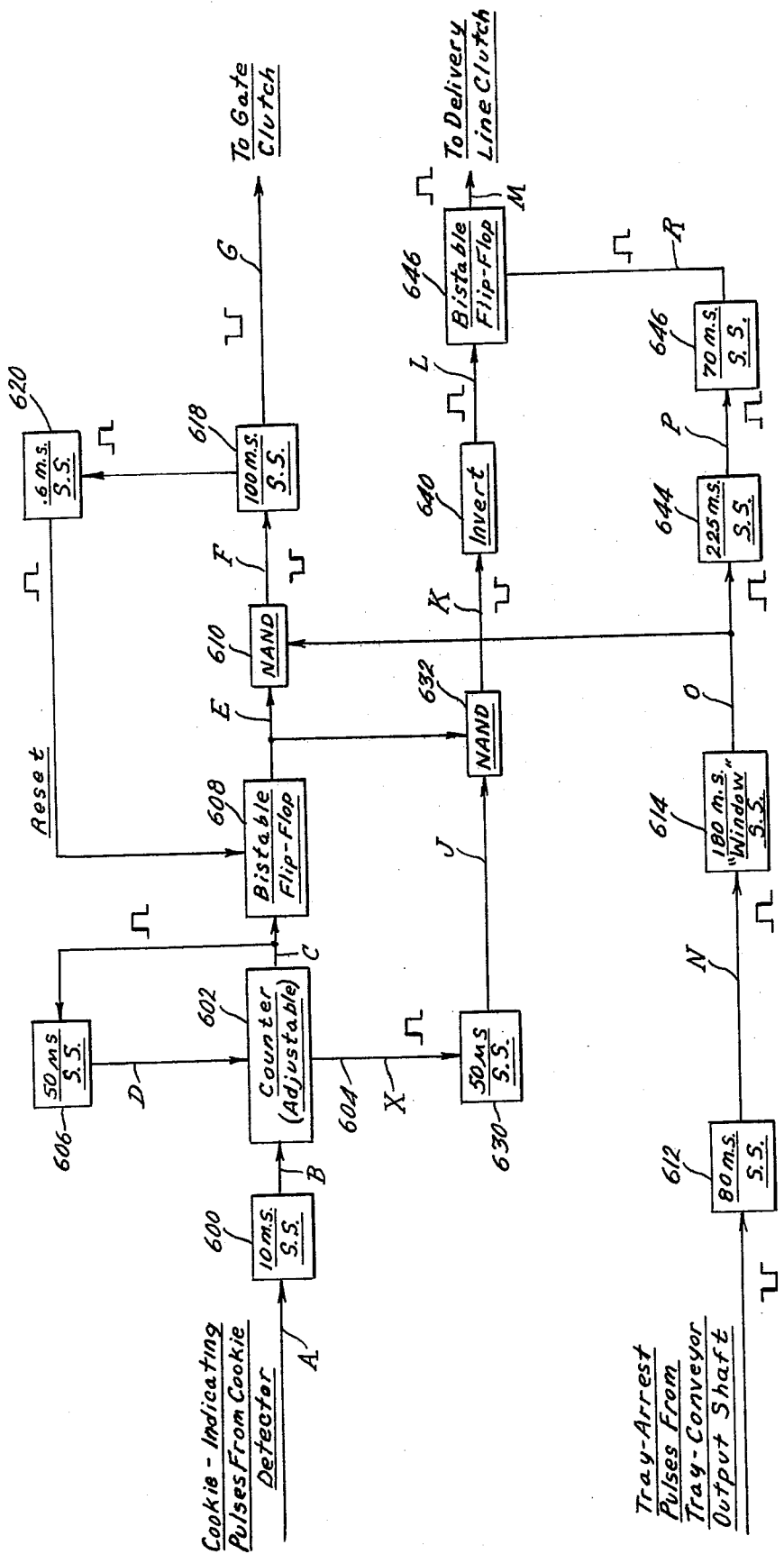

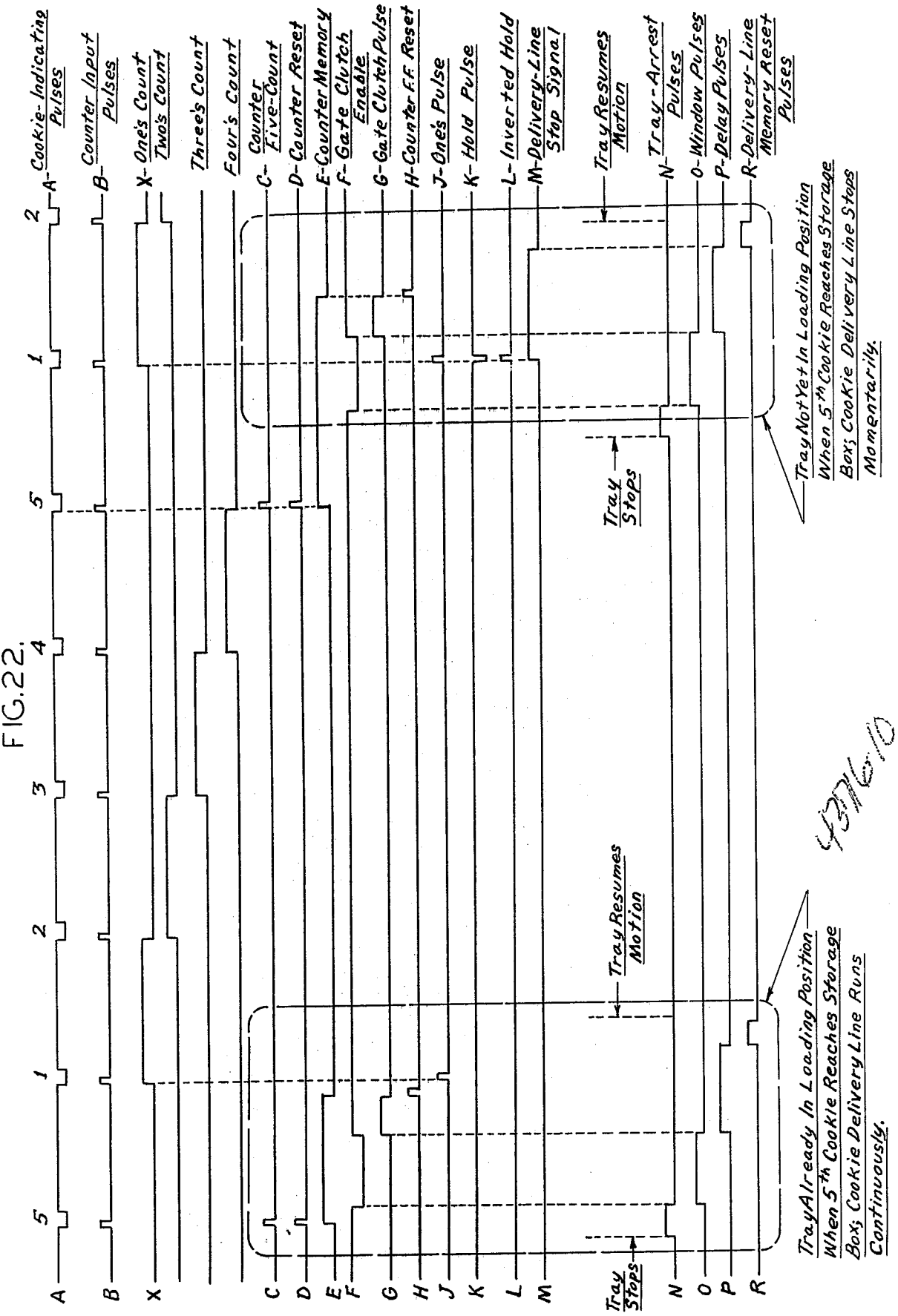

COOKIE DISPENSING APPARATUS

BACKGROUND OF THE INVENTION

The present invention relates generally to apparatus for dispensing wafer-like objects and relates more particularly to apparatus for dispensing stacks of cookies into the pockets of cookie packaging trays.

The packaging of cookies and especially the thin wafer-like variety of cookie requires special considerations due to the extremely fragile and perishable nature of the product. Not only must great care be exercised to guard against breakage during the filling of the cookie shipping containers, but in addition the containers themselves must be designed with sufficient strength to prevent disintegration of the cookies during shipment and storage. Furthermore, the containers must be sealed and airtight to prevent the entrance of moisture and foreign matter which could cause a spoilage of the cookies.

Some forms of cookies such as the familiar ginger snaps have sufficient inherent strength to permit packaging by loose bagging, with the bag being sealed and shipped within a protective cardboard box. More delicate cookies, however, cannot be packaged in such random fashion and must be packaged in compartmented containers with each compartment containing a stack of a predetermined number of cookies. In one form of such package which the present invention is adapted to fill, a tray of plastic material is provided with a plurality of cookie pockets, each of which receives and holds a stack of cookies of a predetermined number, usually ranging from four to seven. The tray, which protects the cookies against breakage during shipping and storage, is inserted after filling into a box or bag which is sealed to prevent the entrance of contaminants.

Heretofore, the trays have been manually filled with the cookie stacks, an operation which requires a substantial number or workers. Not only are high labor costs incurred, but in addition the manual handling of the fragile cookies often results in cookie breakage.

It is accordingly a primary object of the present invention to provide an apparatus for dispensing stacks of cookies into the pockets of cookie packaging trays which minimizes the manual handling of the cookies.

A further object of the invention is to provide an apparatus as described which will operate at a high rate of speed but will handle the cookies in a gentle fashion and essentially eliminate cookie breakage.

Another object of the invention is to provide an apparatus as described which is readily adjustable to operate with cookies of different thicknesses as well as trays of different sizes and of different pocket configurations.

A still further object of the invention is to provide an apparatus as described which can be operated by relatively unskilled operators with a minimal amount of training.

SUMMARY OF THE INVENTION

The pocketed cookie trays to be filled are advanced intermittently along a tray conveyor. At least one cookie delivery assembly is cooperatively associated with said tray conveyor to receive an array of cookies, arrange the cookies into stacks each containing a predetermined number of cookies, and deposit the stacks into the tray pockets.

In the preferred embodiment of the invention, a plurality of cookie delivery assemblies are connected with the tray conveyor to deposit stacks of cookies in the tray pockets at a plurality of cookie dispensing stations. Each cookie delivery assembly is positioned on the tray conveyor to align with a particular tray pocket during the dwell phase of the tray conveyor movement cycle. For example, the first delivery assembly may be aligned with the first tray pocket of a given tray when the tray conveyor is stopped, the second dispenser assembly located further along the conveyor will at the same time be aligned with the second tray pocket of another cookie tray, etc. With such an arrangement, the linear movement or pitch of the intermittent tray conveyor between stops is equal to the spacing between the trays of the conveyor.

The shingler assembly comprises a pair of spaced parallel horizontal feed belts adapted to receive and support an array of edge-supported face-abutting cookies. The shingler feed belts move together to advance the array of cookies toward the separator assembly. A shingling belt disposed parallel to and beneath the feed belts is positioned to engage the lower cookie edges and is driven at a speed substantially higher than that of the feed belt to tilt the lower edges of the cookies forward and produce an inclined or "shingled" attitude of the cookie array.

The separator comprises a pair of spaced separating wheels having resilient cookie-engaging surfaces adapted to engage the lower side edges of each cookie and, due to the higher speed of the cookie-engaging wheel surfaces compared with that of the shingler feed belts, to advance the cookies, lower edge foremost, onto a separating conveyor, the cookies assuming a horizontal attitude as they pass from the separating wheels onto the separator conveyor. The separator assembly also includes an accelerating conveyor onto which the cookies pass from the cseparator conveyor. The accelerating conveyor is driven at a faster speed than the separator and serves to space the cookies at predetermined intervals and prevent overlap of the cookies.

The dispenser assembly includes a stacking chamber disposed above the tray conveyor into which the cookies are delivered by the accelerating conveyor of the separator assembly. The floor of the stacking chamber is formed by a rotatably mounted gate, which is selectively rotatable by a gate actuating means to drop the cookies accumulated in the stacking chamber into a cookie tray pocket. The dispenser assembly includes a control circuit which senses by means of a suitable detector the number of cookies accumulated in the stacking chamber. When the number of cookies in the chamber reaches the predetermined number and a tray is stopped beneath the stacking chamber, the control circuit signals the gate actuating means to rotate the gate, thereby dispensing the cookies into the tray pocket. If the detector senses that the delivery line is about to deliver an additional excess cookie to the stacking chamber, the control circuit momentarily stops the delivery line until the chamber has been emptied. The intermittent tray conveyor operates independently of the cookie dispenser assembly and will continue to intermittently advance the succession of cookie trays regardless of whether the cookie dispenser assemblies have deposited stacks of cookies in each tray pocket. The control circuit has been designed to prevent any cookies from being dispensed into a tray pocket unless a full stack of cookies is present in the stacking chamber to fill the pocket. Accordingly, if an incomplete stack is present in the stacking chamber when a tray is stopped therebeneath, the control circuit will not activate the gate actuating means and the tray pocket will pass unfilled. This insures that the tray pockets will either be properly filled or empty, and an inspector checking the filled trays at the end of the tray conveyor can readily detect an empty pocket which may then be manually filled prior to the final packaging of the trays.

BRIEF DESCRIPTION OF THE DRAWINGS

FIG. 1 is a schematic side elevational view showing the flow of cookies through a shingler assembly and separator assembly of a cookie dispensing apparatus in accordance with the present invention;

FIG. 2 is a sectional view taken along line 2—2 of FIG. 1;

FIG. 3 is a sectional view taken along line 3—3 of FIG. 1;

FIG. 4 is a sectional view taken along line 4—4 of FIG. 1;

FIG. 5 is a schematic side elevational view showing the flow of cookies from the separator assembly into a dispenser assembly and thence into the cookie tray of a tray conveyor of cookie dispensing apparatus in accordance with the present invention;

FIG. 6 is a sectional view taken along line 6—6 of FIG. 5;

FIGS. 8a and 8b are enlarged plan views of one of the cookie delivery assemblies of the apparatus shown in FIG. 7;

FIG. 9a and 9b are side elevational views of the cookie delivery assembly shown in FIGS. 8a and 8b;

FIG. 11 is a sectional view taken along line 11—11 of FIG. 9a;

FIG. 12 is a sectional view taken along line 12—12 of FIG. 9a;

FIG. 13 is a sectional view taken along line 13—13 of FIG. 9b;

FIG. 14 is a sectional view taken along line 14—14 of FIG. 8b;

FIG. 15 is a sectional view taken along line 15—15 of FIG. 14;

FIG. 21 is a block diagram showing the control circuit for controlling the operation of one of said cookie dispenser assemblies; and FIG. 22 is a timing diagram showing the waveforms of signals present at various points in the block diagram of FIG. 21.

DETAILED DESCRIPTION OF THE ILLUSTRATED EMBODIMENT

In view of the complex nature of the disclosure, it would appear desirable to briefly provide an overview of the salient features of the apparatus and a brief description of the flow of cookies through the machine and the functions of each of the sections of the apparatus. This is most conveniently summarized with reference to the plan view of FIG. 7 showing a preferred embodiment of the invention and the schematic views of FIGS. 1-6 which show the cookie flow path and the mechanism features for advancing and dispensing the cookies into the cookie trays.

Figure 7:
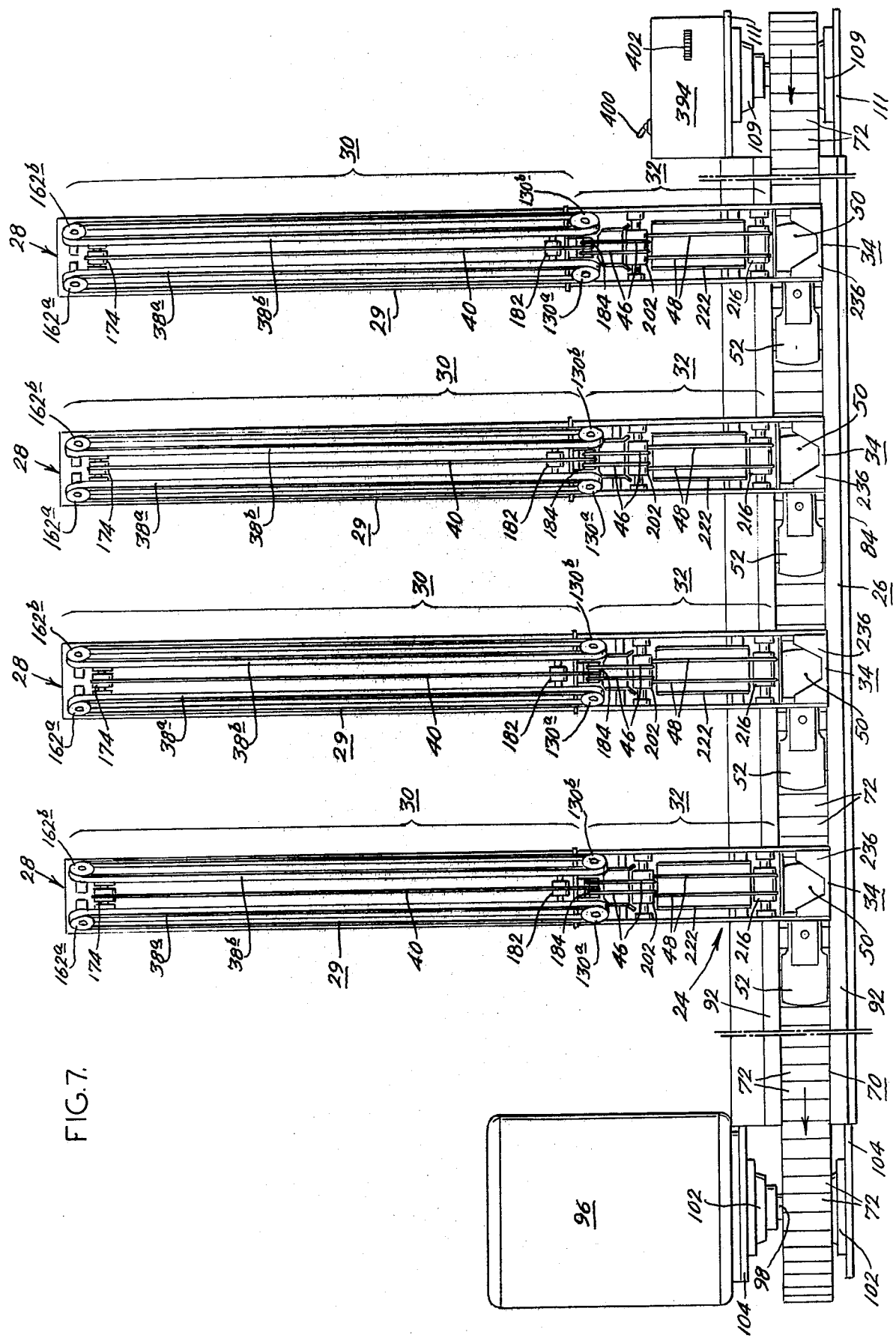
FIG. 7 is a plan view of a cookie dispensing apparatus in accordance with the present invention.

With reference to FIG. 7, a cookie dispensing apparatus generally designated 24 is illustrated which includes a tray conveyor assembly generally designated 26 and four separate but identical cookie delivery assemblies each designated 28 which are carried by and adjustably positionable with respect to the tray conveyor assembly 26. The tray conveyor assembly, the details of which will be described below, intermittently advances a succession of uniformly spaced pocketed cookie trays along its length. As shown in FIG. 6, the cookie tray of the illustrated embodiment has four pockets and accordingly four cookie delivery assemblies are utilized, each assembly filling a different pocket of each of the trays. In order that each cookie dispenser assembly be able to fill a particular pocket of each tray, the distance the conveyor travels between its momentary dwell phases is equal to the spacing between trays. As will be described below, the cookie delivery assemblies are each adjustably positionable with respect to the tray conveyor assembly so that it may be accurately aligned with a tray pocket.

The cookie delivery assemblies 28 each comprise a cookie delivery line 29 (which includes a shingler assembly 30 and a separator assembly 32) and a dispenser assembly 34. Although the views of the drawings with the exception of FIG. 7 shown only a single cookie delivery assembly, it should be understood that the description which follows is applicable to each of the cookie delivery assemblies.

Considering first the delivery line shingler assembly 30, as shown in FIG. 1, it is the function of this assembly to receive a horizontal edge-supported face-abutting array of cookies 36 and to produce an inclined or "shingled" attitude of the cookie array as the cookies are fed into the separator assembly 32. The shingler assembly comprises a pair of spaced parallel cookie feed belts 38a and 38b which in the preferred embodiment of the invention comprise flat timing belts spaced apart a distance somewhat less than the diameter of the cookies and which are inclined at substantially right angles to each other to form a moving trough-like support for the cookie array. A shingling belt 40 disposed equidistant the feed belts 38a and 38b and extending parallel thereto beneath the cookies 36 is arranged in a manner described in detail below to engage the the lower edges of the cookies toward the delivery end of the shingler assembly. The shingler belt 40 is advanced at a substantially higher speed than the feed belts 38a and 38b and accordingly produces an inclined attitude of the cookies as they leave the shingler assembly with the lowermost edge of the cookies extending forwardly.

In the separator assembly 32 as shown in FIG. 1 the shingled cookies are engaged at their lower side edges by the resilient surface of separating wheels 42a and 42b which have a peripheral speed slightly faster than that of the feed belts 38a and 38b and which accordingly pull the lower portion of the cookie ahead at a faster rate than its successor, thereby exerting a positive separating effect to overcome any tendency of the cookies to stick together. The separating wheels as shown in FIG. 1 serve to rotate each cookie as shown by the dash line illustration 44 toward the horizontal attitude which it assumes upon reaching the short separating conveyor 46. From the separating conveyor, the cookies drop onto an accelerating conveyor 48 which runs at a faster speed than the separating conveyor 46 and accordingly produces a substantial predetermined spacing between the cookies as shown in FIG. 5.

The dispenser assembly 34 as shown in FIGS. 5 and 6 includes a stacking chamber 50 into which the cookies are delivered by the accelerating conveyor 48. The cookies are supported within the stacking chamber 50 on a blade-like gate 52 which is rotatably supported and revolved on signal by a gate actuating means 54 to drop a stack of cookies into a pocket of a waiting tray. In FIG. 6, a cookie tray 56 having pockets 58 therein formed by interior partitions 60 is awaiting the dispensing of a cookie stack 62 into one of its pockets 58. A cookie stack 64 has previously been deposited in the tray 56 at the dispensing station of one of the other cookie delivery assemblies.

In the present illustrations, the desired number of cookies 36 forming a stack is five cookies although it will be obvious that this number may be varied depending upon the size of the tray pocket and the thickness of the cookies. As will be discussed hereinafter, the present apparatus is easily adjusted to accommodate cookies of varying thickness and size and is also readily adapted to produce any preselected number of cookies per stack.

To simplify the present specification, the cookie tray 56 has been shown with four pockets 58 in line with the length of the tray. A cookie tray may however have a greater number of pockets, for example six to eight and the pockets may be arranged in two rows in staggered relation. As will become apparent, the present apparatus is adjustable to suit a variety of package styles and is particularly well suited to providing a variety of cookies in each tray by simply introducing a different cookie into each cookie delivery assembly.

The control circuit which coordinates the operation of the shingler annd separator sections with the gate actuating means 54 is explained in considerable detail herebelow. For an understanding of the function of the circuit as it relates to the schematic description thus far presented, it should be sufficient to state that the gate actuating means 54 will not rotate the gate 52 to release the cookie stack into a tray until two conditions are met, namely, that a sufficient number of cookies are present in the stacking chamber to constitute the stack, and that a tray is stopped beneath the stacking chamber. Should the circuit sense that an additional excess cookie is about to be delivered into the stacking chamber, the delivery line is momentarily stopped until the stacking chamber has been emptied. Since the tray conveyor operates in an intermittent fashion independently of the cookie dispenser assemblies, it is quite possible that a cookie tray pocket may go unfilled due to the absence of a sufficient number of cookies in a stacking chamber when the tray is presented to the dispenser assembly for filling. Such an empty tray pocket will be quickly noted and filled by an inspector at the end of the tray conveyor. The control circuit thus insures that the tray pockets will either be accurately filled or not filled at all since a partly filled pocket could be difficult to detect with the trays passing by an inspector at a high rate of speed.

Figure 10:
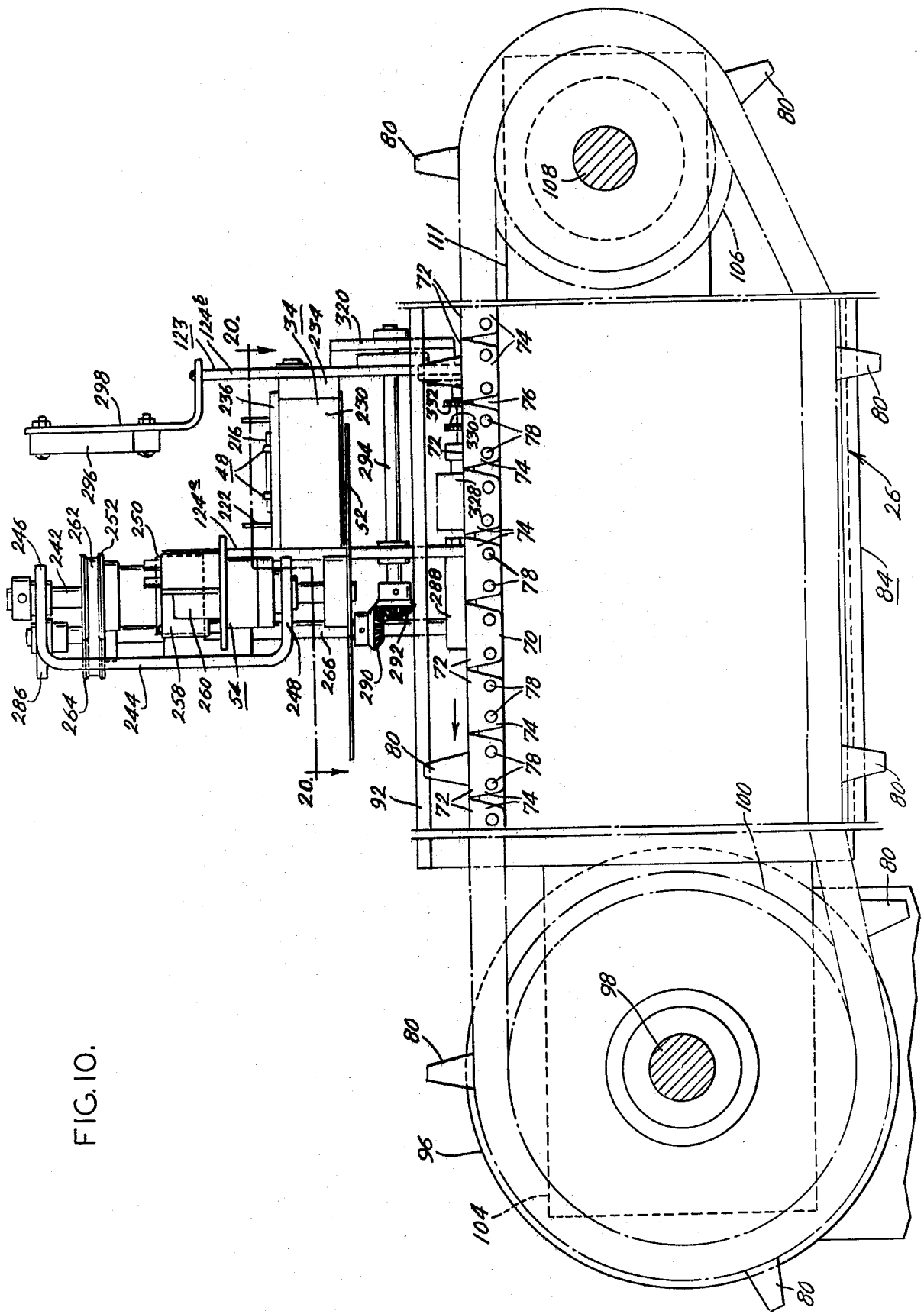
FIG. 10 is an enlarged and elevational view of one of the cookie dispenser assemblies and part of the tray conveyor assembly of the apparatus of FIG. 7.

Considering the details of the preferred embodiment of the apparatus illustrated in FIGS. 7–22, the tray conveyor assembly 26 as best illustrated in FIGS. 7, 9b and 10 comprises a tray conveyor belt assembly 70 formed by a plurality of rectangular plates 72 each having a pair of spaced parallel downwardly extending drive elements 74 thereon which are connected to a drive chain 76 by pins 78. Every sixth plate 72 is provided with an upwardly extending tray dog 80 between which the cookie trays 56 are disposed as shown in FIG. 6.

The plates 72 slide along spaced bearing strips 82 attached to a generally rectangular-sectioned frame 84 which as shown in FIG. 9b is formed of opposed channel shaped members 84a and 84b. The frame elements 84a and 84b are spaced to provide upper and lower slots 86 and 88 between which the conveyor belt elements pass. The return run of the conveyor as shown in FIG. 9b is supported on spaced bearing strips 90 which engage the outer face of the plates 72 with the tray dogs 80 passing between the frame members 84a and b in the slot 88. The trays 56 are maintained in longitudinal alignment on the tray conveyor by tray guide rails 92 extending the length of the conveyor and supported above the conveyor frame by posts 94. The conveyor frame 84 is supported above the floor by a system of braces and leg members which are not shown since they form no part of the present invention. It should be noted however that since the entire weight and support of the several cookie delivery assemblies are carried by the conveyor frame, the conveyor frame supporting arrangement must be securely anchored.

The conveyor chain 76 is driven by a motor 96 at one end of the conveyor assembly acting through a suitable mechanism (not shown) to intermittently drive the conveyor drive shaft 98 and the chain sprocket 100 mounted thereon. Bearings 102 secured to spaced conveyor frame members 104 support the drive shaft 98. At the opposite ends of the tray conveyor assembly 26, an idler sprocket 106 carried by idler shaft 108 is rotatably supported by bearings 109 on the spaced extending frame members 111. As indicated above, the motor 96 serves to advance the conveyor trays intermittently, with the length of each advance between dwell periods being equal to the distance between the cookie trays on the conveyor, which is the same distance as the distance between the tray dogs 80.

The cookie delivery assemblies 29 are, as indicated above, of an identical construction and are each detachably secured to and slidable along a pair of spaced horizontal upper and lower supporting rails 110 and 112 as shown most readily in FIG. 9b. The delivery assemblies are each supported on a cantilevered lower frame assembly 113 which comprises spaced vertical frame members 114 having arm portions 116 and 118 engaging the supporting rails 110 and 112. Horizontal frame members 120 extending from the vertical frame members 114 are braced by the diagonal frame members 122. The entire cookie delivery assembly 28 may be positioned longitudinally along the tray conveyor assembly by sliding the frame member arm portions 116 and 118 along the rails 110 and 112 until the desired position has been reached. Locking screw means (not shown) are employed to secure the cookie delivery assembly in the desired position.

Supported on the lower frame assembly 113 is an upper frame assembly 123 including a pair of upstanding frame plates 124a and 124b which is adjustable longitudinally along the frame members 120 by bolt and slot means (not shown). A channel shaped shingler support table 126 extends outwardly longitudinally of the frame plates 124a and 124b and is secured thereto by bolts 128. The shingler assembly 30 is mounted on the shingler support table 126 annd includes the spaced feed belts 38a and 38b which in the preferred embodiment comprise timing belts having their flat faces disposed to receive the array of cookies. The cookie-engaging feed belt runs are spaced apart a distance somewhat less than the diameter of the cookies and are inclined to each other at approximately 90° angle as shown in FIGS. 11 and 12 so as to be substantially tangential to the edges of the cookies. The belts 38a and 38b respectively are driven by the timing belt pulleys 130a and 130b mounted on drive shafts 132a and 132b. A vertical bulkhead 134 extending transversely between the frame plates 124a and 124b as shown most clearly in FIG. 13 is provided along its upper irregular edge with parallel brackets 136 and 138 through which the shaft 132a journalled, and brackets 140 and 142 through which the shaft 132b is journalled. An auxiliary shaft 144 supported by the brackets 136 and 138 is connected to the shaft 132a by the gears 146 and 148 respectively and at its opposite end is connected by miter gear 150 to a miter gear 152 on the shaft 132b, thereby providing a geared connection between the shafts 132a and 132b and insuring their rotation at exactly the same rate. The shaft 132b is driven in rotation by means of the pinion gear 154 at the lower end thereof which meshes with the worm gear 156 on shaft 158 supported by bracket 160 extending from the bulkhead 134. The drive means for the shaft 158 will be described herebelow in conjunction with the gear train for driving the other moving elements of the cookie delivery assembly.

The feed belts 38a and 38b pass over idler pulleys 162a and 162b which rotate respectively on shafts 164a and 164b which are carried by the support block 166 on the outer end of table 126 as shown in FIGS. 9a and 11. The prevent undue sagging of the feed belt runs, a belt-supporting trough 168 having sloping sidewall portions 168a and 168b extending at substantially right angles to each other is provided beneath the cookie engaging runs of the feed belts for approximately two-thirds of the length of the belts. The trough is supported on posts 170 on the table 126 as shown most clearly in FIGS. 9a and 12.

The shingling belt 40 in the preferred embodiment comprises a round resilient conveyor belt, the upper run of which passes above the bottom of the trough 168 while the lower run passes through apertures 172 in the posts 170. The shingling belt passes over an idler pulley 174 rotatable on shaft 176 supported by the spaced upright members 178 of support block 180 secured to the table 126 adjacent the block 166. The shingling belt 40 passes to each side of a height adjusting pulley 182 and, at the end of its run, around a drive pulley 184 which is rotatably mounted on bracket 186 secured to bulkhead 134.

The height of the upper cookie engaging run of the shingler belt 40 adjacent the delivery end of the shingler is important and is accordingly adjustable by means of an adjustment assembly 188 to suit the particular cookies being dispensed. The adjustment assembly 188 includes an adjustment block 190 having guide means (not shown) permitting only a vertical movement of the block. An upstanding arm 192 extending from the block 190 provides a support for the pulley 182 which is journalled between the bifurcated upper ends thereof. Vertical adjustment of the pulley 182 is effected by means of an adjustment screws 194 which is threadedly engaged in bracket 196 on the bulkhead 134 and engages the bottom of the block 190. Locking screw 198 passing through a slot in the block 190 and threadedly engaging the bulkhead 134 locks the block and the wheel 182 in the desired position.

The separator assembly 32 as indicated above includes the separating wheels 42a and 42b having resilient cookie-engaging surfaces. In the illustrated embodiment, the separating wheels rotate with the timing belt drive pulleys 130a and 130b on the shafts 132a and 132b. Since the operating wheels have a larger diameter than the adjacent pulley drive sprockets, they rotate at a faster circumferential speed than the adjacent feed belts 38a and 38b. As the lower edge of each cookie is engaged by the separating wheels, the cookie is lifted from the feed belts and, with the top edge resting on the succeeding cookie, is advanced lower edge forwardly toward a horizontal attitude. The separating wheels are particularly effective when the cookies tend to stick together which is often the case with thin wafer-like cookies and those which have been iced. The separating wheels may be supported and driven independently of the shingler feed belts and feed belt drive sprockets although in the preferred form they are conveniently located together on the same drive shaft.

The separating conveyor 46 comprises a pair of conveyor belts 200 which extend between the pulley 184 and a drive roller 202 on shaft 204 which is driven in a manner described below. A trough-shaped guide element 206 extends beneath the separating conveyor belts 200 and includes upstanding side portions for maintaining the cookies in alignment on the conveyor. The guide elemnt 206 is mounted on a cross member 208 extending between the frame plates 124a and 124b. The conveyor belts 200 in passing around the pulley 184 drive the shingler belt 40 at the same speed as the separator conveyor belts which as indicated above is substantially faster than the speed of the feed belts 38a and 38b.

The accelerating conveyor 48 comprises a pair of spaced conveyor belts 210 which pass around an idling roller 212 on shaft 214 extending between the frame plates 124a and 124b beneath the separating conveyor 46. At their opposite end, the conveyor belts 210 pass around the drive roller 216 secured to shaft 218 journalled by the frame members 124a and 124b extending through the frame members 124a to receive a chain sprocket 220 secured thereto. The drive arrangement for this sprocket and shaft will be described in detail below. A trough shaped conveyor guide 222 extends beneath the conveyor belts 210 and includes vertical side edges which serve to maintain the cookies on the conveyor belts. The conveyor guide 222 is supported by the cross member 224 extending between the frame plates 124a and 124b. As indicated above, the drive shaft 218 is driven at a speed sufficient to produce a substantial increase in the velocity of the cookies in comparison to that of the separating conveyor 46 and will accordingly produce a spaced relationship of the cookies as they pass across the accelerating conveyor toward the dispenser assembly 34.

Figure 16:
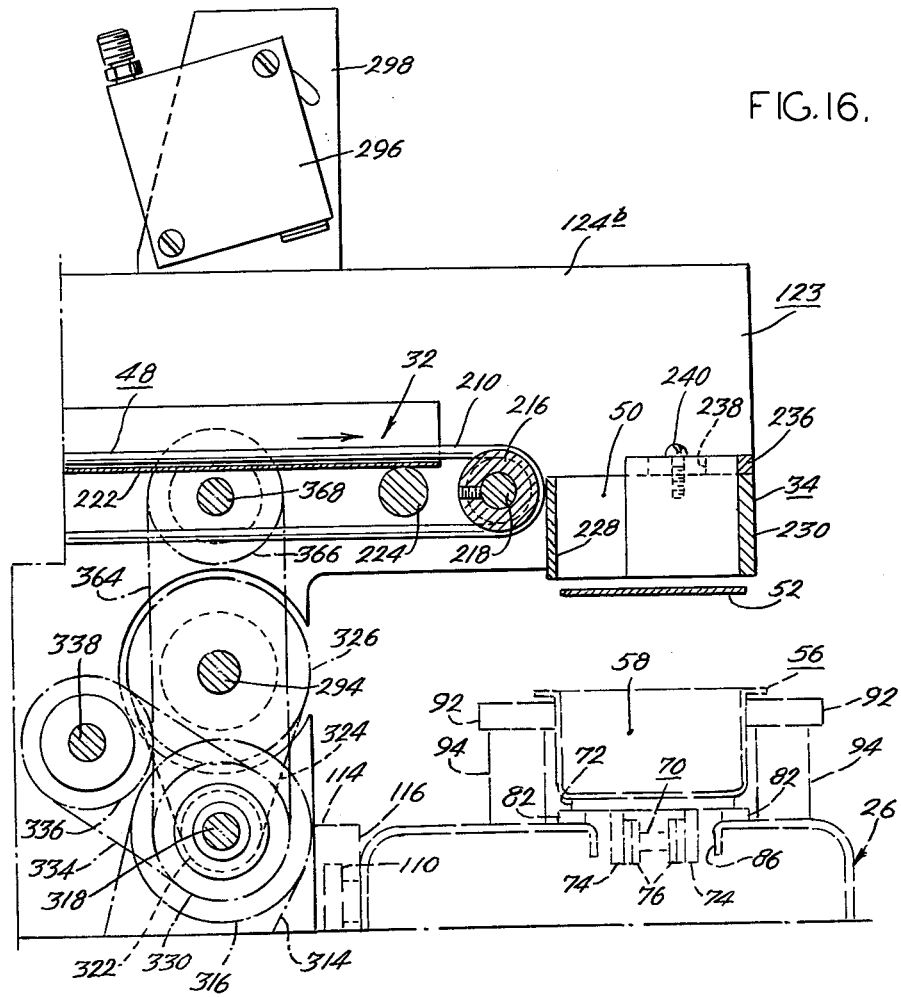
FIG. 16 is a sectional view taken along line 16—16 of FIG. 8b.

Considering the details of the dispenser assembly, the assembly includes the stacking chamber 50 which as illustrated most clearly in FIGS. 8b and 16 is formed between the frame plates 124a and 124b by parallel wall members 228 and 230 extending therebetween and members 232 and 234 respectively secured to the frame elements 124a and 124b. A cookie guide 236 having beveled sidewalls which serve to center the stack of cookies within the chamber is adjustable by means of the slots 238 in the flange portion thereof supported by members 232 and 234 in cooperation with the locking screws 240. Adjustment of the guide by means of the slots and screws may be made to adapt the stacking chamber for cookies of different diameters.

Figure 17:
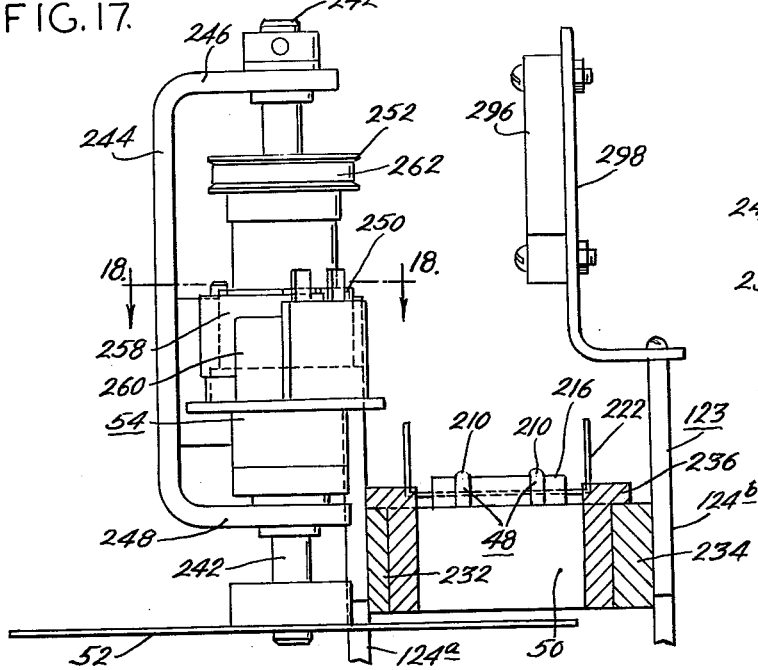
FIG. 17 is a sectional view taken along line 17—17 of FIG. 9b.
Figure 18:
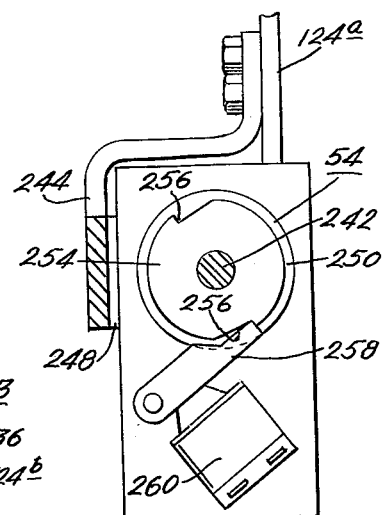
FIG. 18 is an enlarged sectional view taken along line 18—18 of FIG. 17.

With the stacking chamber located as illustrated in the schematic view of FIG. 5 and the detailed views of FIGS. 8b and 16 at the discharge end of the accelerating conveyor 48, the cookies advanced by the accelerating conveyor will drop into the stacking chamber and accumulate in a stack aligned by the cookie guide 236. The bottom of the stacking chamber 50 is normally closed by the blade-shaped gate 52 which as shown most clearly in FIG. 17 is secured to the vertical shaft 242 of the gate actuating means 54 for selective rotation thereby. The gate and gate actuating means are mounted on a bracket 244 attached to the frame plate 124a, the bracket including upper and lower arms 246 and 248 which carry suitable bearing means for supporting the shaft 242. The gate actuating means 54 comprises a gate clutch 250 which serves upon signal to transmit rotary motion from the belt driven timing belt pulley 252 rotatably disposed on the upper part of the shaft 242 and connected with the clutch 250, to the shaft 242 to rotate the gate 52. As shown in FIG. 18, the rotary shaft movement produced by the clutch 250 is limited by the stop collar 254 having detents 256 therein spaced 180° apart and which are engaged by the pawl 258 controlled by solenoid 260. Upon signal from the control circuit as described herebelow, the solenoid 260 will retract the pawl 258 from one of the detents 256, allowing the clutch to drive the shaft through 180° before the pawl engages the opposite detent and stops the shaft rotation. Since the shaft 242 passes through the center of the gate 52, a 180° rotation of the gate will swing one end of the gate away from the stacking chamber, permitting the stack of cookies to fall into the tray pocket therebelow, and return the opposite end of the gate to again close the bottom of the stacking chamber and permit the subsequent cookie stack to be formed.

Figure 19:
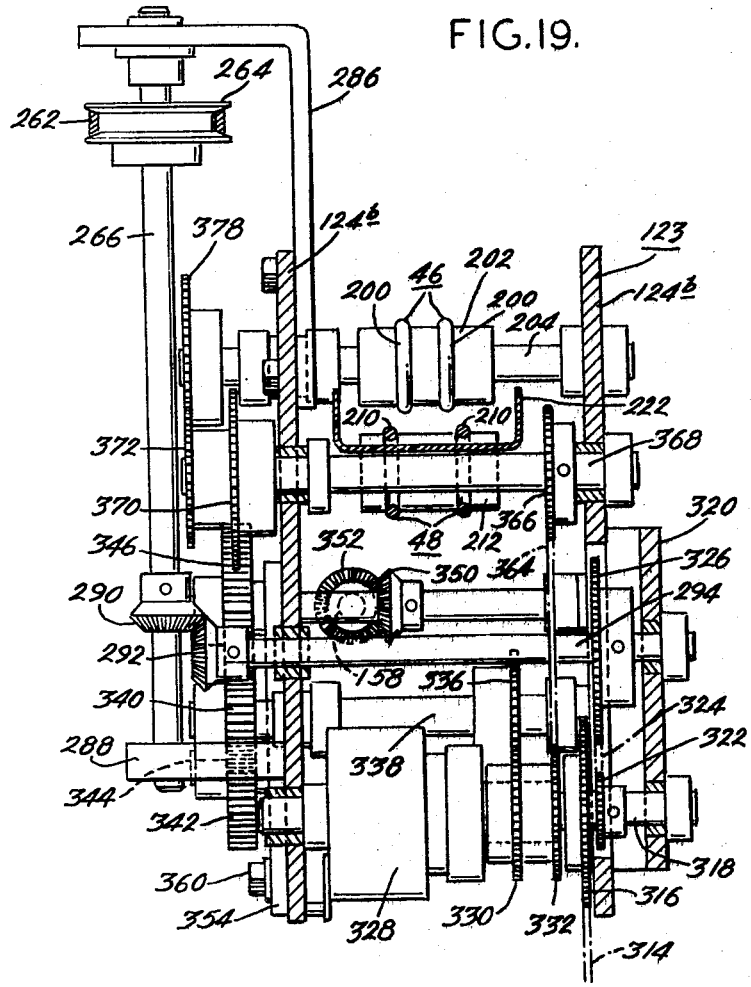
FIG. 19 is a sectional view taken along line 19—19 of FIG. 9b.
Figure 20:
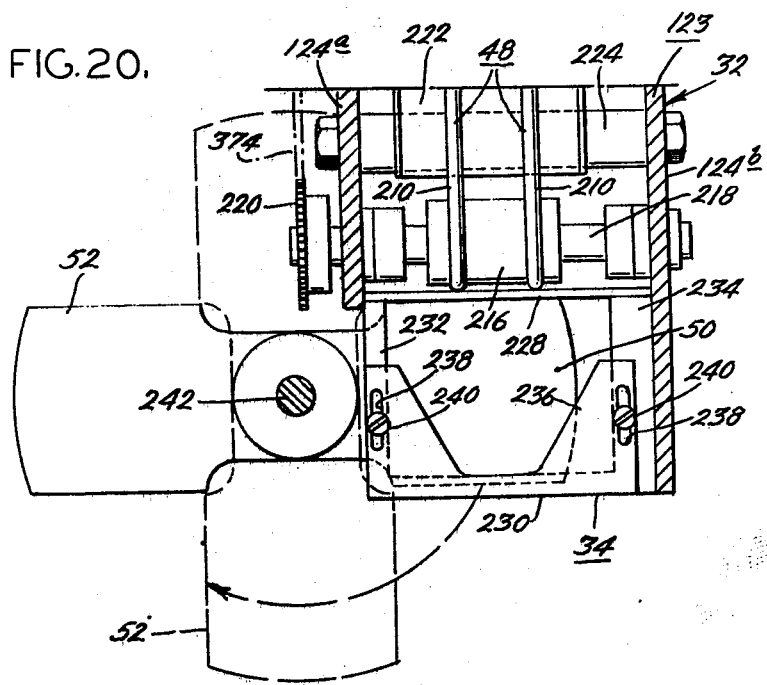
FIG. 20 is an enlarged sectional view taken along line 20—20 of FIG. 10.

The timing pulley 252 is at all times driven in rotation by the timing belt 262 which is in turn driven by the timing pulley 264 on the vertical shaft 266. The shaft 266 is rotatably supported at its upper and lower ends respectively by brackets 286 and 288 extending from the frame plate 124a. A miter gear 290 on the shaft 266 meshes with a miter gear 292 on the shaft 294 extending through and journalled within the frame plates 124a and 124b as shown in FIG. 19. The manner in which this shaft is driven is more specifically described below.

As shown in FIGS. 8b and 17, a cookie detector 296 mounted on bracket 298 attached to frame element 124b is vertically disposed above the accelerating conveyor 48 to detect the passage of a cookie on the accelerating conveyor. The detector 296 is preferably an electro-optical device for generating an electrical pulse upon passage of a cookie, and in the preferred form of the invention comprises an infrared scanner. The pulse signals from the detector 296 are transmitted to the control circuit for utilization as described below.

The details of the drive mechanism for the shingler assembly, separator assembly and dispenser assembly are most readily gained by reference to FIGS. 9a, 9b, 16 and 19. A single motor 300 connected with the gear box 302 drives the chain sprocket 304, chain 306 and the chain sprocket 308 secured to shaft 310 journalled between the frame members 122. A chain sprocket 312 on the shaft 310 is connected by chain 314 to a chain sprocket 316 on the shaft 318 which is carried at one end by the frame element 124a and at its other end by a bracket 320 extending from the frame plate 124b. A chain sprocket 322 on the shaft 318 is connected by chain 324 to a larger chain sprocket 326 on the shaft 294 to thereby drive the shaft 294 continuously in rotation. Through the drive elements previously described including the shaft 266 and the belt 262, this insures a constant rotation of the timing pulley 252 connected with the gate clutch 250.

The shingler assembly and the separator assembly are also driven from the shaft 318. However, the drive to these assemblies is interrupted during certain conditions by the control circuit acting through the electric clutch 328. The clutch 328 selectively couples the shaft 318 with the chain sprockets 330 and 332, the sprocket 330 serving to drive the feed belts 38a and 38b and the separating wheels 42a and 42b, while the sprocket 332 serves to drive the shingling belt and separating conveyor and the accelerating conveyor. The sprocket 330 is connected by chain 334 to a chain sprocket 336 on shaft 338 extending between the frame plates 124a and 124b. Outboard of the frame plate 124a, a gear 340 is keyed to the shaft 338, which gear meshes with gear 342 on stub shaft 344. The gear 342 in turn meshes with a gear 346 on shaft 348 extending between the frame plates 124a and 124b. A miter gear 350 on the shaft 348 drives a miter gear 352 on the shaft 158 which as previously described by means of worm gear 156 and pinion 154 drives the shaft 132b and shaft 132a to drive the shingler feed belts and the cookie separating wheels.

The stub shaft 344 is carried by an adjustable bracket 354, the upper end of which is slotted at 356 to span the shaft 348. The lower end of the bracket 354 includes an arcuate slot 362 in the frame plate 124a. The slots 356, 358 and 362 allow a selective repositioning of the bracket 354 and accordingly permit a changing of gears 340 and/or 346 to a larger or smaller size gear with a resultant change in the speed of drive of the shingler feed belts. Such a change may be desirable with cookie runs of different thicknesses since the cookie thickness will determine the rate at which the cookies will be fed from the shingler onto the separating and accelerating conveyors.

The drive arrangement for the shingling belt, separating and accelerating conveyors includes a drive chain 364 engaged with the sprocket 332 on shaft 318 and driving the sprocket 366 on shaft 368 on shaft 368 journalled in the frame plates 124a and 124b. As shown in FIG. 19, a pair of chain drive sprockets 370 and 372 are mounted on the shaft 368 outboard of the frame plate 124a. The sprocket 370 is connected by chain 374 to the sprocket 220 on shaft 218 which drives the accelerating conveyor 48. The sprocket 372 is connected by chain 376 to a chain sprocket 378 on the end of the separating conveyor drive shaft 204 to drive the separating conveyor.

As described generally hereinbefore, an electronic timing control system contained in the control box 394 (FIG. 7) controls the dispensing of the stacks of cookies of correct preselected number from each dispenser assembly, into the proper pocket of each tray. The control system will be described as it is constituted and used to control one cookie feed line and dispenser, it being understood that the portion of the control system which responds to cookie detector pulses is duplicated for each additional cookie delivery line and dispenser assembly which is used in a particular installation. Basically, the control system receives from a pickoff sensor (not shown) on the output shaft of the tray conveyor intermittent drive unit a series of tray-arrest pulses, each indicating a time at which the tray conveyor stops to permit delivery of cookie stacks to the trays from the dispensers; it also receives a series of cookie-indicating pulses, each indicating the time at which a cookie reaches the infrared cookie detector 296 positioned along the cookie delivery line just preceding the stacking chamber. In response to these two signals, the control system performs the following functions:

(1) Designating the preselected number of cookies to be assembled in each stack as $n$, if the nth cookie-indicating pulse in a dispensing cycle is received before a particular tray-arrest pulse, or in a short "window" interval immediately following that tray arrest pulse, then the gate clutch 250 is actuated and the stack of cookies is dispensed onto the tray corresponding to that tray-arrest pulse. The system then resets in preparation for the next dispensing cycle.

(2) If less than $n$ cookie-indicating pulses have been received prior to the end of the window interval, the gate clutch 250 is not actuated and the tray moves onward without receiving any cookies at all from the dispenser, a fault condition which is easy to observe later by visual inspection. When additional cookies are subsequently delivered to the stacking chamber to complete the stack, these will be detected by the cookie detector, and the additional cookie-indicating pulses so produced will then cause the dispenser to dispense a full stack of $n$ cookies onto a subsequent tray.

(3) If $n+1$ cookie-indicating pulses are produced before the end of the "window" interval, indicating that one more than the desired number of cookies is about to be delivered to the stacking chamber, the control system responds by immediately disengaging the delivery-line drive clutch 328 to stop the delivery line before the $(n+1)$th cookie can travel from the cookie detector to the stacking chamber. The delivery line remains stopped until the desired stack of $n$ cookies has been dispensed to the tray and the tray has moved onward; the delivery-line clutch 328 is then caused to re-engage and deliver the $(n+1)$th cookie to the stacking chamber. The $(n+1)$th cookie is counted as the first of the next group of $n$ cookies. Thus, for example, in one normal condition of operation in which the cookie delivery rate is somewhat higher than would be necessary to assure complete filling of each stack for each tray, the cookie-delivery line will be arrested briefly at the end of each complete stacking of $n$ cookies, and will resume motion when the complete stack has been dispensed.

FIG. 21 shows in block form one preferred logic circuit for providing the foregoing control functions, although other specific arrangements may be used. In FIG. 21, the pulses shown adjacent the various connecting lines indicate the polarity of pulses on that line; a broadened edge on any such pulse waveform indicates the pulse edge on which the next subsequent device triggers. The pulses shown in FIG. 21 are not to scale; the relative timings and durations of the pulses are more fully shown by the waveforms of FIG. 22, in which the vertical dimension in each waveform indicates the signal level and the horizontal dimension represents time to a common scale for all waveforms. The letters identifying the latter waveforms are keyed to the corresponding letters on the block diagram of FIG. 21, to show where in the system each waveform appears. The group of waveforms at the left of FIG. 22 are for the case in which the tray is already in loading position when the nth cookie reaches the stacking chamber, while the waveforms at the right are for the case in which the tray is not yet in position when the nth cookie reaches the stacking chamber.

More particularly, negative cookie-indicating pulses A from the cookie detector are applied to a 10 millisecond single-shot 600, which responds by producing positive pulses B of 10 millisecond (m.s.) duration, each such pulse beginning at the beginning of the corresponding cookie-indicating pulse. In FIG. 22 it is assumed, as an example, that the stacks are to contain 5 cookies, and in waveform A an identifying number from 1 to 5 is therefore shown above each cookie-indicating pulse to identify the pulse with a particular cookie in the stack of five. The diagram shows waveforms for one set of five cookies, plus the fifth cookie of the preceding group and the first cookie of the next group. The pulses B are applied to the counting input of a counter 602 which produces, at its output line C, a positive pulse each time it has counted 5 of the pulses B. The counter is preferably such as to produce, internally and on separate lines, a pulse upon attaining of each count from 1 to $n$, for example from 1 to 9, and is provided with a manual selector enabling the operator to select which count will produce the output pulse at C, in this example a count of 5. Such internally-available and manually-selectable pulse signals are shown by way of example between waveforms B and C of FIG. 22 for counts of one to four. The count which is manually selected determines the number of cookies which will be accumulated in each stack. Counter 602 also produces an output pulse on line 604 in response to the first cookie in each group, for reasons discussed hereinafter. Counter 602, as well as each of the other elements in FIG. 21, may be entirely conventional in itself.

The output of counter 602 is applied back to its reset terminal through a 50 microsecond single-shot 606 to reset the counter promptly after it completes its selected count; this reset is shown at D, and causes the counter output pulse C to be relatively short in duration as shown.

The counter output pulse C is applied to a trigger input terminal of a bistable flip-flop 608, to actuate the flip-flop output from its low level to its high level, as shown at E. Flip-flop 608 serves as a counter memory to retain the information that the desired count has been obtained, until the flip-flop is reset as described later.

The output signal E of flip-flop 608 is applied to one input terminal of a NAND gate 610, the output signal F of which is normally high, and goes low only when both of its input terminals are high. The other input terminal of the NAND gate is controlled by the tray-arrest pulses as will now be described.

The tray-arrest pulses produced by the tray-conveyor output shaft are of somewhat variable form and hence are applied to an 80 m.s. single shot 612 to produce at N a reliably-configured pulse of 80 m.s. duration beginning at each arrest of the tray conveyor. The pulses N are applied to a 180 m.s. single shot 614 to produce, at its output line O, "window" pulses of 180 m.s. pulse. Pulses O are applied to the previously-mentioned other input terminal of NAND gate 610.

Output F of NAND gate 610 therefore goes high when, and only when: (a) flip-flop 608 indicates that 5 cookie-indicating pulses have been received, and (b) the output from the single shot 614 indicates that a tray is arrested in loading position to receive cookies and not much more than a "window" time of about 180 m.s. has elapsed since tray arrest. The window time is sufficiently short that the tray does not resume motion until well after the end of the window time. Accordingly, when NAND gate 610 goes low as shown at F, the tray will be in proper position to receive cookies and the proper number of cookies will be in the stacking chamber for delivery to the tray. The low output F of the NAND gate 610, designated as a gate clutch enable pulse, is applied to 100 m.s. single shot 618 to produce a delayed gate clutch pulse G for actuating the gate clutch to dispense the cookie stack onto the tray. The duration of the window pulse, as mentioned above, is short enough that cookie dispensing can only occur before the tray begins moving again.

The lagging edge of the gate-clutch pulse is also used to operate a 0.6 m.s. single shot 620 for producing a short reset pulse H, which is applied back to the counter-memory flip-flop 608 to reset it to its original state, ready for another cycle of operation.

The above-described sequence of operations is illustrated at the left of FIG. 22, wherein it is assumed that the tray is in arrested position at a time such that the entire dispensing operation for a group of 5 cookies is completed before the next (sixth) cookie is counted. In this event the cookie-delivery line runs continuously and does not stop. However, there are two other conditions which can occur, namely (a) the fifth cookie may not be delivered to the stacking chamber until it is time for the tray to resume motion, or (b) the tray may not arrive at its arrested loading position until after a sixth cookie has been counted and is about to be dropped into the stacking chamber.

In condition (a) above, it will be seen that the failure of the fifth cookie to arrive and be detected before the end of the window pulse will prevent the NAND gate 610 from operating, and hence dispensing will not take place at all with respect to the tray which is then present. The tray will therefore move out empty, a condition readily detectable by later visual check of the tray. The control system will then operate in response to the arrest of the next tray for which delivery of the desired fifth cookie to the stack occurs in the proper time interval. The cookie counter 602 will, at such time, promptly indicate a full stack of five, and the stack will be dispensed onto the newly-arrived subsequent tray.

It is noted, however, that in the last-assumed case it is quite likely that a sixth, unwanted cookie will arrive at the cookie detecctor and be ready for delivery to the stacking box before the preceding stack of five is dispensed. This same condition can also arise whenever the steady rate of cookie delivery is more than 5 times the rate at which the trays pass the dispensing station, a condition which can occur in normal adjustments of the system and which corresponds with condition (b) mentioned above. The control system accommodates this condition, and in fact tolerates it as a normal operating condition, as follows.

Counter 602 produces on its output line 604 a counter-one's count pulse X (see FIGS. 21 and 22) beginning at the start of the first cookie-indicating pulse following each reset of the counter 602; the counter-one's pulse terminates when the second, or next, cookie-indicating pulse is counted. The pulse X is applied to a 50 microsecond single shot 630, which responds by producing a short, 50-microsecond one's pulse J, beginning at the time of the counter-one's count pulse X. One's count pulse J is applied to one input of a NAND gate 632, the other input of which is supplied with the output E from counter flip-flop 608. NAND gate 632 therefore produces a negative hold pulse at its output K in response to pulse J when, and only when, flip-flop 608 has been set, indicating a count of 5, but has not yet been reset in response to a gate clutch pulse. The negative hold pulse from NAND gate 632 therefore indicates that a 6th or (n+1)th cookie-indicating pulse has been produced prior to dispensing, and therefore that the cookie delivery line should be promptly stopped before the undesired 6th cookie is delivered to the stack of five in the stacking chamber.

To accomplish this, the negative pulse signal K from the NAND gate 632 is passed through a pulse-polarity inverter 640 to produce a corresponding inverted hold pulse L which sets a bistable flip-flop 646 to a condition in which its output is positive; the positive flip-flop signal M is applied to the clutch 328 for the delivery-line drive, to hold the clutch disengaged and stop the delivery line immediately, before the 6th cookie is delivered into the stacking chamber.

To restart the delivery line after the stack of 5 has been dispensed and the gate reclosed, the window pulse signal O is applied to a 225 m.s. delay single shot 644, which produces a positive pulse signal P starting at the end of the window pulse and continuing for 225 m.s. This provides a delay sufficient for the dispenser gate to reclose after its dispensing operation. The signal P is applied to a 70 m.s. single shot 646, the output R of which is a 70 m.s. reset pulse applied to the flip-flop 646 to reset it to the state in which the delivery line resumes normal motion. As mentioned above, the delay provided by single shot 644 is sufficient that the delivery line does not resume motion until a time such that the 6th, or (n+1)th cookie will not reach the stacking chamber dispensing gate until the gate has completed its dispensing action and reclosed. In this way the sixth cookie is caused to become the first cookie in the next group of five.

The operation of the apparatus has been described above in detail in connection with the detailed description of the components thereof and particularly in the description of the control circuit. Only a brief summary of the operating steps is accordingly deemed necessary.

To initiate the cookie dispensing operation, the master switch 400 on the control box 394 is switched on to start the tray conveyor motor 96 and the delivery assembly motor 300, and to energize the control circuit. The counter selector switch 402 on the control box is set to the number of cookies desired in a stack, the selector switch 402 controlling the counter 602 of the control circuit. Cookie trays are then manually fed onto the tray conveyor upstream of the dispensing stations so as to fill each space between the conveyor feed dogs 80. Cookies are manually fed onto the shingler feed belts 38a and 38b of each of the cookie delivery assemblies 28 in edge-supported face-abutting relation to form an array of cookies as illustrated in FIG. 1. The apparatus then automatically feeds the cookies into the dispenser stacking chambers and dispenses the stacks into the tray pockets in the manner described above. The filled trays are inspected as they are removed from the tray conveyor and any empty pockets are filled manually.

From the simplicity of the operating steps, it can be understood that operators can be trained to operate the present apparatus in a very short time. The cookies need only be handled when loading the shingler feed belts, and breakage is accordingly held to a minimum. The feed belts and separating wheel cookie-engaging surfaces are resilient to further minimize cookie breakage, even at high operating speeds.

Manifestly, changes in details of construction can be effected by those skilled in the art without departing from the spirit and scope of the invention.

We claim:

1. Cookie dispensing apparatus for dispensing stacks of cookies into the pockets of cookie packaging trays comprising a tray conveyor assembly including a tray conveyor belt successively advancing spaced multi-pocketed cookie trays thereon, drive means for intermittently driving said tray conveyor belt, at least one cookie delivery assembly associated with said tray conveyor assembly, said cookie delivery assembly comprising a cookie delivery line and a dispenser assembly, said cookie delivery line being adapted to deliver cookies to said dispenser assembly, said dispenser assembly being disposed above said tray conveyor belt and including a stacking chamber for receiving cookies from said cookie delivery line, and a gate selectively movable to discharge a stack of cookies from said stacking chamber, gate actuating means for controlling movement of said gate, said cookie delivery line comprising a shingler assembly for receiving an array of edge-supported face-abutting cookies and tilting said cookies into a shingled attitude, and a separator assembly for receiving cookies from said shingler assembly and delivering them individually in spaced relation to said dispenser assembly, said apparatus including control means for controlling the delivery of cookies from said cookie delivery line to said dispenser assembly and from said dispenser assembly to said conveyed trays.

2. The invention as claimed in claim 1 wherein said apparatus includes a plurality of said cookie delivery assemblies, the number of said assemblies being equal to the number of pockets in each said cookie tray.

3. The invention as claimed in claim 1 wherein said shingler assembly comprises a pair of spaced parallel feed belts adapted to support the cookie array, means for advancing said feed belts at a predetermined speed, a shingling belt parallel to said feed belts and disposed below and equidistant said feed belts, means for advancing said shingling belt at a substantially higher speed than said feed belts and in the same direction therewith, said shingling belt being positioned so as to engage the lower edges of said cookies during at least a portion of said feed belt run to produce a backward tilt of said cookies.

4. The invention as claimed in claim 3 including means for adjusting the spacing of said shingling belt with respect to said feed belts.

5. The invention as claimed in claim 3 wherein said feed belts comprise timing belts disposed with their cookie-engaging faces in substantially perpendicular relation to each other and substantially tangential to the cookies disposed thereupon.

6. The invention as claimed in claim 3 wherein said feed belts are spaced apart a distance less than the diameter of the cookies.

7. The invention as claimed in claim 3 including support means disposed beneath said feed belts to prevent sagging of said belts under the weight of said cookies.

8. The invention as claimed in claim 1 wherein said separator assembly comprises a pair of spaced cookie separating wheels adapted to engage the edges of each cookie passing from said shingler assembly, said separating wheels having resilient cookie-engaging surfaces, means for rotating said separating wheels to provide a circumferential speed of said cookie engaging surfaces which is faster than the linear speed of said shingler feed belts, a separating conveyor for receiving the cookies from the separating wheels, and means for driving said separating conveyor at a substantially faster speed than that of said shingler feed belts, said separating wheels serving to individually pivot each cookie toward a horizontal attitude as the cookie is advanced by the wheels onto the separating conveyor.

9. The invention as claimed in claim 8 wherein said separating wheels rotate about mutually perpendicular axes.

10. The invention as claimed in claim 8 wherein said separator assembly includes an accelerating conveyor for receiving cookies from said separating conveyor, and drive means for driving said accelerating conveyor at a substantially faster speed than said separating conveyor to thereby produce a spaced relation of the cookies conveyed thereby.

11. The invention as claimed in claim 10 wherein said separating and accelerating conveyors each comprise substantially horizontal belt conveyors.

12. Cookie delivery apparatus for receiving an edge-supported face-abutting array of cookies and delivering said cookies in separated face-supported individually spaced relation, said apparatus comprising a shingling assembly and a separator assembly, said shingling assembly comprising a pair of spaced parallel feed belts adapted to support the array of cookies, means for advancing said feed belts at a predetermined speed, a shingling belt parallel to said feed belts and disposed below and equidistant said feed belts, means for advancing said shingling belt at a substantially higher speed than said feed belts and in the same direction therewith, said shingling belt being positioned so as to engage the lower edge of said cookies during at least a portion of said feed belt run to produce a backward tilt of said objects, said separator assembly comprising a pair of spaced cookie separating wheels adapted to engage the edges of each cookie passing from said shingler assembly, said separating wheels having resilient cookie-engaging surfaces, means for rotating said separating wheels to provide a circumferential speed of said cookie engaging surfaces which is faster than the linear speed of said shingler feed belts, a separating conveyor for receiving the cookies from the separating wheels, and means for driving said separating conveyor at a substantially faster speed than that of said shingler feed belts, said separating wheels serving to individually pivot each cookie toward a horizontal attitude as the cookie is advanced by the wheels onto the separating conveyor.

13. The invention as claimed in claim 12 wherein said feed belts and separating wheels are spaced apart a distance less than the diameter of the cookies.

14. The invention as claimed in claim 12 including means for adjusting the spacing of said shingling belt with respect to said feed belts.

15. The invention as claimed in claim 12 wherein said feed belts comprise timing belts disposed with their cookie-engaging faces in substantially perpendicular relation to each other and substantially tangential to the cookies disposed thereupon.

16. The invention as claimed in claim 12 wherein said separating wheels rotate about mutually perpendicular axes.

17. The invention as claimed in claim 12 wherein said separator assembly includes an accelerating conveyor for receiving cookies from said separating conveyor, and drive means for driving said accelerating conveyor at a substantially faster speed than said separating conveyor to thereby produce a spaced relation of the cookies conveyed thereby.

18. The invention as claimed in claim 17 wherein said means for advancing said feed belt and shingling belts and said means for driving said separating and accelerating conveyors are coupled to a common drive means permitting selective simultaneous stopping and starting of said belts and conveyors.

19. Apparatus for producing a shingled disposition of an array of wafer-like objects arranged in edge-supported face-abutting relation, comprising a pair of spaced parallel feed belts adapted to support the array of objects, said feed belts comprising timing belts disposed at their cookie-engaging faces in substantially perpendicular relation to each other and substantially tangential to the cookies disposed thereupon, means for advancing said feed belts at a predetermined speed, a shingling belt parallel to said feed belts and disposed below and equidistant said feed belts, means for advancing said shingling belt at a substantially higher speed than said feed belts and in the same direction therewith, said shingling belt being positioned so as to engage the lower edges of said objects during at least a portion of said feed belt run to produce a backward tilt of said objects.

20. The invention as claimed in claim 19 including means for adjusting the spacing of said shingling belt with respect to said feed belts.

21. The invention as claimed in claim 19 wherein said feed belts are spaced apart a distance less than the diameter of the cookies.

22. The invention as claimed in claim 19 including support means disposed beneath said feed belts to prevent sagging of said belts under the weight of said cookies.

23. The invention as claimed in claim 19 wherein said means for advancing said feed belts and said means for advancing said shingling belts are coupled to a common drive means permitting selective simultaneous stopping and starting of said feed belts and shingling belts.

* * * * *